(12) United States Patent
Devasigamani et al.

(10) Patent No.: US 12,234,020 B2
(45) Date of Patent: Feb. 25, 2025

(54) SYSTEM FOR COMBINED DIHYDROGEN HEATING AND FLUID COOLING FOR AN AIRCRAFT, AND AIRCRAFT COMPRISING SUCH A SYSTEM

(71) Applicants: Airbus SAS, Blagnac (FR); Airbus Operations SAS, Toulouse (FR)

(72) Inventors: Nandakumar Devasigamani, Toulouse (FR); Darren Paget, Toulouse (FR); Jorge Carretero Benignos, Taufkirchen (DE)

(73) Assignees: AIRBUS SAS, Blagnac (FR); AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 17/993,158

(22) Filed: Nov. 23, 2022

(65) Prior Publication Data

US 2023/0166847 A1    Jun. 1, 2023

(30) Foreign Application Priority Data

Nov. 29, 2021  (FR) ...................................... 2112637

(51) Int. Cl.
| | | |
|---|---|---|
| *B64D 13/08* | (2006.01) | |
| *B64D 37/30* | (2006.01) | |
| *B64D 13/06* | (2006.01) | |

(52) U.S. Cl.
CPC ............ *B64D 13/08* (2013.01); *B64D 37/30* (2013.01); *B64D 2013/0614* (2013.01); *B64D 2013/0659* (2013.01)

(58) Field of Classification Search
CPC ..................... B64D 13/08; B64D 37/30; B64D 2013/0614; B64D 2013/0659; F02C 7/143; F02C 7/224; F02C 9/40; F02C 3/22

See application file for complete search history.

(56) References Cited

U.S. PATENT DOCUMENTS

| | | | | |
|---|---|---|---|---|
| 4,062,184 A | | 12/1977 | Hagen | |
| 4,569,195 A | * | 2/1986 | Johnson | ..................... F02C 9/16 60/39.55 |

(Continued)

FOREIGN PATENT DOCUMENTS

CN        1259219 C       6/2006

OTHER PUBLICATIONS https://web.archive.org/web/20170513184813/https://understandingchp.com/chp-applications-guide/4-3-gas-turbines/; 2016, energy solution.*

(Continued)

*Primary Examiner* — Todd E Manahan
*Assistant Examiner* — Rodolphe Andre Chabreyrie
(74) *Attorney, Agent, or Firm* — Greer, Burns & Crain, Ltd.

(57) ABSTRACT

A method for combined cooling and heating in an aircraft, the aircraft including an engine configured to use dihydrogen as fuel, the dihydrogen being stored in liquid form in a tank and being used in gas form in the engine, the dihydrogen being conveyed from the tank to the engine by a main pipe. The method includes the steps of branching off a part of the flow of dihydrogen in a bypass pipe, in parallel with a predefined segment of the main pipe, circulating a first heat transfer fluid in a first closed circuit, carrying out a first heat exchange between the first heat transfer fluid and the dihydrogen circulating in the bypass pipe and carrying out at least one secondary heat exchange. Each secondary heat exchange is carried out between the first heat transfer fluid and a working fluid used in the aircraft which needs to be cooled.

14 Claims, 3 Drawing Sheets

(56) References Cited

U.S. PATENT DOCUMENTS

| | | | |
|---|---|---|---|
| 2015/0275758 A1* | 10/2015 | Foutch | F02C 7/047 60/785 |
| 2016/0160758 A1 | 6/2016 | Marchaj | |
| 2019/0153952 A1* | 5/2019 | Niergarth | F02C 7/14 |
| 2020/0088098 A1* | 3/2020 | Roberge | F02C 7/16 |
| 2020/0088102 A1* | 3/2020 | Roberge | F02C 7/224 |
| 2021/0340908 A1* | 11/2021 | Boucher | F02C 7/224 |
| 2022/0298967 A1* | 9/2022 | Balandier | F02C 6/18 |

OTHER PUBLICATIONS

NPL Boeing 737 (Year: 2020).*
French Search Report dated Jun. 13, 2022; priority document.

* cited by examiner

SYSTEM FOR COMBINED DIHYDROGEN HEATING AND FLUID COOLING FOR AN AIRCRAFT, AND AIRCRAFT COMPRISING SUCH A SYSTEM

CROSS-REFERENCES TO RELATED APPLICATIONS

This application claims the benefit of the French patent application No. 2112637 filed on Nov. 29, 2021, the entire disclosures of which are incorporated herein by way of reference.

FIELD OF THE INVENTION

The present invention relates to the field of heat exchanges, and concerns in particular an installation in an aircraft for heating and cooling fluids.

BACKGROUND OF THE INVENTION

An increasing number of developments are being made to engines that use dihydrogen as fuel. This is the case, in particular, for engines of the turboprop type used in aircraft. In such an aircraft, it is necessary to transport the dihydrogen in the liquid state for reasons of size, then to reheat the dihydrogen so that it enters the gas state at a temperature above 0° C. and can be used as fuel in the engine.

The heating of the dihydrogen is conventionally carried out by means of a heat exchange with a heat source obtained from the exhaust gases of the turbine of the engine.

It would furthermore be advantageous to use the liquid dihydrogen as a cold source for cooling other fluids of the aircraft, such as oil or alternatively air, for example oil for lubricating the engine or compressed air recovered from the engine and used for the conditioned air of the cabin of the aircraft. A heat exchange between the liquid dihydrogen and the fluids would thus make it possible both to heat the dihydrogen and to cool the fluids of the aircraft.

SUMMARY OF THE INVENTION

For this purpose, one solution envisaged by the inventors could comprise using a common circuit comprising a heat transfer fluid which, by means of successive heat exchanges, makes it possible to recover the heat obtained from the exhaust gases, heat the dihydrogen and cool the fluids of the aircraft, such as oil and compressed air.

Such a solution, however, would entail a risk of the fluids of the aircraft freezing, particularly the oil, because of the loss of heat experienced by the oil during a heat exchange with the heat transfer fluid, the latter having been cooled by the liquid dihydrogen.

There would furthermore be a risk of the heat transfer fluid itself freezing during a heat exchange with the liquid dihydrogen and/or of it reaching its boiling temperature in end pieces of heat exchangers. This could cause the circulation of the heat transfer fluid to stop, leading to a shutdown of the heating of the dihydrogen and the cooling of the fluids of the aircraft, or alternatively malfunction of the heat exchangers, leading to poor reliability of the heat exchanges being carried out.

It is therefore desirable to overcome these drawbacks.

It is, in particular, desirable to provide a reliable solution which makes it possible to cool the fluids of the aircraft.

It is furthermore desirable to provide a solution which makes it possible to reheat the liquid dihydrogen to a temperature sufficient for it to be used as fuel in the engine of the aircraft.

It is also desirable to provide a solution which makes it possible to keep the fluids of the aircraft at operating temperatures, and in particular above the solidification temperatures of the fluids of the aircraft.

It is an object of the present invention to provide a method for combined cooling and heating in an aircraft, the aircraft comprising an engine configured to use dihydrogen as fuel, the dihydrogen being stored in liquid form in a tank and being used in gas form in the engine, the engine being a turboprop. The dihydrogen is conveyed from the tank to the engine by means of a pipe referred to as the main pipe, and the method comprises the steps of: branching off a part of the flow of dihydrogen in a pipe, referred to as the bypass pipe, in parallel with a predefined segment of the main pipe; circulating a first heat transfer fluid in a first closed circuit; carrying out a first heat exchange between the first heat transfer fluid and the dihydrogen circulating in the bypass pipe; and carrying out at least one second heat exchange, referred to as a secondary heat exchange, each secondary heat exchange being carried out between the first heat transfer fluid and a fluid that is used in the aircraft and needs to be cooled, referred to as a working fluid.

It is thus possible to cool one or more working fluids of an aircraft reliably by using dihydrogen as a cold source.

According to one particular embodiment, the method furthermore comprises the steps of: circulating a second heat transfer fluid in a second closed circuit; carrying out a third heat exchange between the second heat transfer fluid and the dihydrogen circulating in a part of the main pipe; and carrying out a fourth heat exchange between the second heat transfer fluid and an exhaust gas coming from a turbine of the engine.

It is thus possible to heat the liquid dihydrogen in order to be able to use it as fuel in the engine while cooling a working fluid, without the working fluid being at risk of freezing.

According to one particular embodiment, the third heat exchange is carried out downstream of the predefined segment of the main pipe.

According to one particular embodiment, the third heat exchange is carried out upstream of the predefined segment of the main pipe.

It is thus possible to use a first heat transfer fluid having a narrower operating range: it is not necessary to use a first heat transfer fluid operating at sufficiently low temperatures to withstand significant loss of heat due to interaction with the liquid dihydrogen.

According to one particular embodiment, the first heat transfer fluid has an operating temperature range narrower than the operating temperature range of the second heat transfer fluid.

The risks of the first and second heat transfer fluids freezing are thus avoided, as are the risks of the first and second heat transfer fluids boiling in end pieces of heat exchangers.

According to one particular embodiment, the working fluid is oil or compressed air coming from the engine and intended to be used in an air conditioning system of the aircraft.

According to one particular embodiment, the method comprises a first secondary heat exchange between the first heat transfer fluid and a first working fluid and a second secondary heat exchange between the first heat transfer fluid and a second working fluid, the first working fluid being oil and the second working fluid being compressed air coming from the engine and intended to be used in an air conditioning system of the aircraft.

According to one particular embodiment, the method furthermore comprises carrying out a regulation of the flow of dihydrogen circulating in the bypass pipe according to a temperature of the working fluid, which is measured at the exit of the secondary heat exchange through which the working fluid passes.

It is thus possible to optimize the cooling of the working fluid.

According to one particular embodiment, the method furthermore comprises carrying out a regulation of the flow of dihydrogen circulating in the bypass pipe according to a temperature of the first heat transfer fluid, which is measured at the entry of the first heat exchange.

The invention also relates to a system for combined cooling and heating in an aircraft, the aircraft comprising an engine configured to use dihydrogen as fuel, the dihydrogen being stored in liquid form in a tank and being used in gas form in the engine, the engine being a turboprop. The dihydrogen is conveyed from the tank to the engine by means of a pipe referred to as the main pipe, and the system comprises:
- a pipe, referred to as the bypass pipe, mounted bypassing a predefined segment of the main pipe,
- a first closed circuit intended to contain a first heat transfer fluid,
- a first circulator intended to circulate the first heat transfer fluid in the first closed circuit,
- a first heat exchanger installed so as to allow a first heat exchange between the first heat transfer fluid and the dihydrogen circulating in the bypass pipe, and
- a second heat exchanger installed so as to allow at least one second heat exchange, referred to as a secondary heat exchange, each secondary heat exchange being carried out between the first heat transfer fluid and a fluid that is used in the aircraft and needs to be cooled, referred to as a working fluid.

In particular, the first circulator corresponds to a pump.

According to one particular embodiment, the system furthermore comprises:
- a second closed circuit intended to contain a second heat transfer fluid,
- a second circulator intended to circulate the second heat transfer fluid in the second closed circuit,
- a third heat exchanger installed so as to allow a third heat exchange between the second heat transfer fluid and the dihydrogen circulating in a part of the main pipe,
- a fourth heat exchanger installed so as to allow a fourth heat exchange between the second heat transfer fluid and an exhaust gas coming from a turbine of the engine.

In particular, the second circulator corresponds to a pump.

The invention also relates to an aircraft comprising at least one such system.

BRIEF DESCRIPTION OF THE DRAWINGS

The above-mentioned characteristics of the invention, as well as others, will become clearer on reading the following description of the at least one exemplary embodiment, the description being given with reference to the appended drawings, in which.

DETAILED DESCRIPTION OF THE PREFERRED EMBODIMENTS

Figure 1:
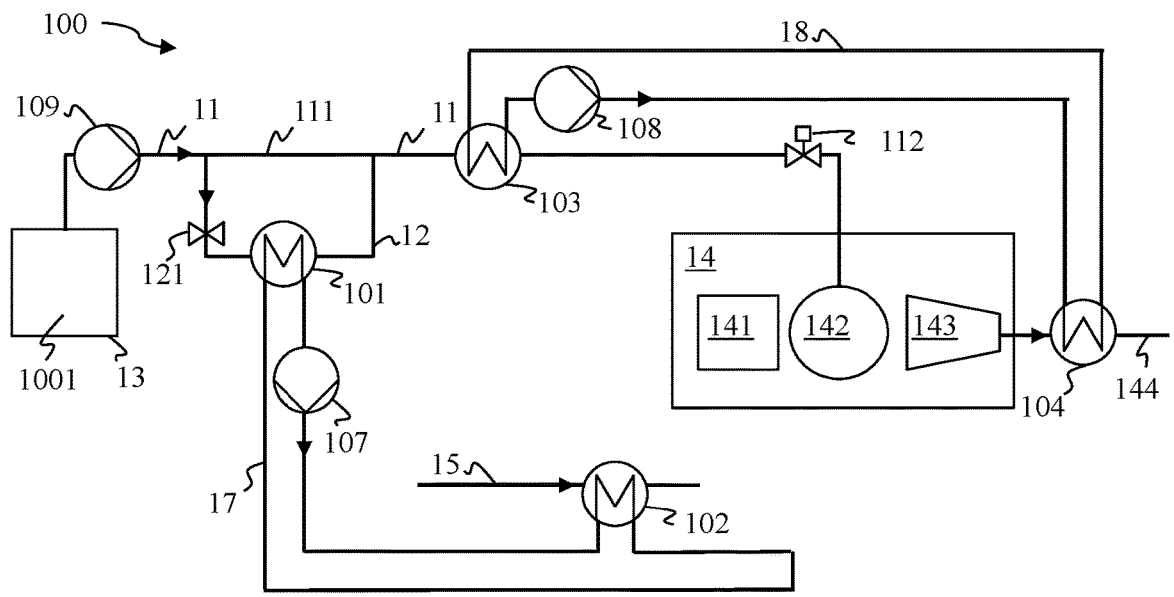
FIG. 1 schematically illustrates a system for combined heating and cooling, which is intended to implement heat exchanges in an aircraft, according to a first exemplary embodiment.
Figure 5:
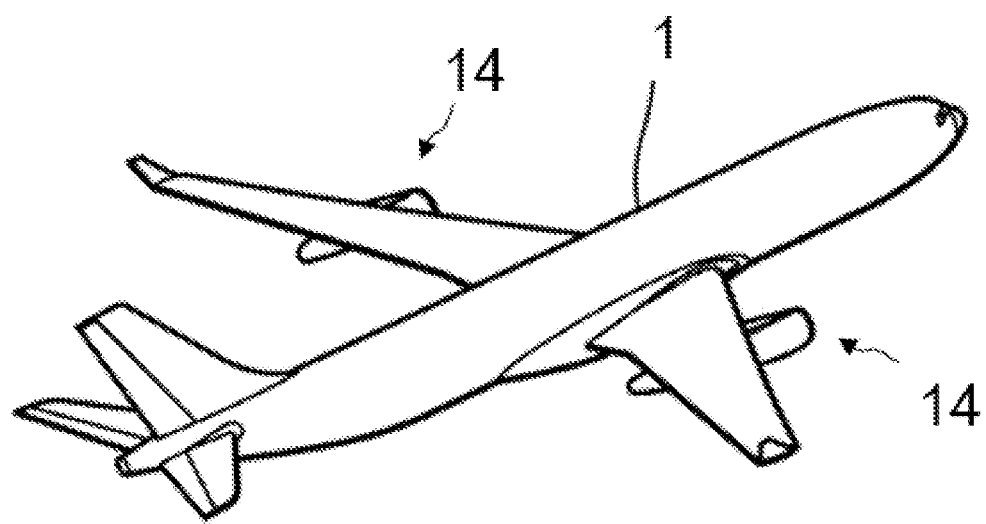
FIG. 5 illustrates an aircraft equipped with a system for combined heating and cooling.

FIG. 1 thus schematically illustrates a first exemplary embodiment of a system 100 for combined heating and cooling, which is configured to implement heat exchanges in an aircraft such as the aircraft 1 represented in FIG. 5.

The system 100 comprises a tank 13 storing dihydrogen 1001 in liquid form. The temperature of the dihydrogen 1001 in the tank 13 is, for example, −253° C. The system 100 furthermore comprises a pipe, referred to as the main pipe 11, for transporting the dihydrogen 1001 from the tank 13 to a combustion chamber 142 of an engine 14 of the aircraft, where it is used as fuel. The dihydrogen 1001 is circulated with the aid of a circulator 109, such as a pump, located on the main pipe 11 at the exit of the tank 13. The main pipe 11 comprises a fuel metering valve 112 located at the entry of the combustion chamber 142. The fuel metering valve 112 makes it possible to inject a predefined quantity of dihydrogen 1001 into the combustion chamber 142.

The engine 14 is a turboprop, and it furthermore comprises a compressor 141 configured to compress air entering the combustion chamber 142, as well as a turbine 143 located at the exit of the combustion chamber 142.

The system 100 furthermore comprises a pipe, referred to as the bypass pipe 12, separate from the main pipe 11 and located bypassing a predefined segment 111 of the main pipe 11. The bypass pipe 12 is configured to transport a part of the flow of dihydrogen 1001 passing through the main pipe 11 and coming from the tank 13, between an entry of the bypass pipe 12 and an exit of the bypass pipe 12. The other part of the flow of dihydrogen 1001 passing through the main pipe 11 is transported in parallel in the predefined segment 111 of the main pipe 11, between the entry of the bypass pipe 12 and the exit of the bypass pipe 12.

Optionally, the system 100 furthermore comprises a flow controller 121 located on the bypass pipe 12. The flow controller 121 is controlled by a control unit and makes it possible to regulate the flow of dihydrogen 1001 passing through the bypass pipe 12.

The system 100 comprises a first closed circuit 17, in which a first heat transfer fluid is circulated in a predefined direction, for example with the aid of a circulator 107 such as a pump.

The first closed circuit 17 comprises a first heat exchanger 101 and at least one second heat exchanger 102, referred to as a secondary heat exchanger.

The system 100 furthermore comprises a second closed circuit 18, in which a second heat transfer fluid is circulated in a predefined direction, for example with the aid of a circulator 108 such as a pump. The second closed circuit 18 comprises a third heat exchanger 103 and a fourth heat exchanger 104.

Each heat exchanger 101, 102, 103, 104 makes it possible to carry out a heat exchange between two fluids without mixing them, in other words to transfer heat from one fluid to the other fluid across an exchange surface.

The first heat exchanger 101 makes it possible to carry out a first heat exchange between the first heat transfer fluid and the dihydrogen 1001 passing through the bypass pipe 12. The first heat exchange leads to a transfer of heat from the first heat transfer fluid to the dihydrogen 1001 passing through the bypass pipe 12, and thus makes it possible to cool the first heat transfer fluid and to reheat a part of the flow of dihydrogen 1001.

The secondary heat exchanger 102 makes it possible to carry out a second heat exchange, referred to as a secondary heat exchange, between the first heat transfer fluid and a fluid that is used in the aircraft and needs to be cooled, referred to as a working fluid. The working fluid is transported in a pipe 15, which may be a closed circuit 151 (not represented in FIG. 1 but visible in FIG. 3) or a pipe transporting the working fluid from a recovery zone 1521 (not represented in FIG. 1 but visible in FIG. 3) to a working zone 1522 (not represented in FIG. 1 but visible in FIG. 3). The working fluid is, for example, oil or compressed air.

The third heat exchanger 103 makes it possible to carry out a third heat exchange between the second heat transfer fluid and the dihydrogen 1001 transported by the main pipe 11. The third heat exchange leads to a transfer of heat from the second heat transfer fluid to the dihydrogen 1001, and thus makes it possible to cool the second heat transfer fluid and reheat the dihydrogen 1001. The third heat exchange leads to a sufficient supply of heat to the dihydrogen 1001 so that the dihydrogen 1001, which is liquid at the entry of the third heat exchanger 103, vaporizes and reaches a temperature above 0° C., so as to allow stable combustion in the combustion chamber 142. The dihydrogen 1001 is thus in the gas state at the exit of the third heat exchanger 103 and may then be used as fuel in the engine 14. The dihydrogen 1001 is in a liquid state in the part of the main pipe 11 located between the tank 13 and the third heat exchanger 103, and in a gas state in the part of the main pipe 11 located between the third heat exchanger 103 and the engine 14.

According to the first exemplary embodiment, the third heat exchanger 103 is located downstream of the predefined segment 111 of the main pipe 11. An element located downstream of an identified zone of a pipe is located on the opposite side of the identified zone from a source of a fluid circulating in the pipe. An element located upstream of an identified zone of a pipe is located on the same side of the identified zone as the source of a fluid circulating in the pipe. The source of the dihydrogen 1001 circulating in the main pipe 11 and the bypass pipe 12 is the tank 13. For example, the third heat exchanger 103 is located on the side of the predefined segment 111 that is opposite to the tank 13. The dihydrogen 1001 is then in a liquid state in the predefined segment 111 and in the bypass pipe 12. The fourth heat exchanger 104 makes it possible to carry out a fourth heat exchange between the second heat transfer fluid and an exhaust gas that comes from the turbine 143 of the engine 14 and is transported in an exhaust gas pipe 144. The fourth heat exchange leads to a transfer of heat from the exhaust gas to the second heat transfer fluid, and thus makes it possible to reheat the second heat transfer fluid.

The first heat transfer fluid may, for example, be water glycol. Water glycol comprises water and comprises a proportion of ethylene glycol or propylene glycol, and is used as a heat transfer fluid in the liquid state. The operating temperature of water glycol is defined between its melting temperature and is boiling temperature, and these vary according to the proportion of ethylene glycol or propylene glycol. Particularly, the higher the proportion of ethylene glycol, the lower the melting temperature of the water glycol. Alternatively, the first heat transfer fluid may be a gas such as dinitrogen or helium. The second heat transfer fluid may, for example, be a gas such as dinitrogen or helium.

Furthermore, the second heat transfer fluid must operate, on the one hand, at sufficiently low temperatures to withstand the loss of heat transmitted to the dihydrogen 1001 in the third heat exchanger 103 without freezing, in other words without the solidification temperature of the second heat transfer fluid being reached. Specifically, the temperature of the dihydrogen 1001 changes in the third heat exchanger 103 from about −253° C. to a temperature above 0° C. so as to allow stable combustion in the combustion chamber 142. On the other hand, the second fluid must operate at sufficiently high temperatures to withstand the supply of heat received from the exhaust gas in the fourth heat exchanger 104 without reaching the boiling temperature of the second heat transfer fluid.

The first heat transfer fluid, conversely, has an operating temperature range narrower than that of the second heat transfer fluid. The first heat transfer fluid must be able to absorb an amount of heat in the secondary heat exchanger 102 which is sufficient for the working fluid to be cooled and small enough to avoid the working fluid freezing, in other words to avoid the solidification temperature of the working fluid being reached.

According to one embodiment, the flow of dihydrogen 1001 passing through the bypass pipe 12 is regulated by the flow controller 121, under the control of the control unit, according to a measured temperature of the working fluid. The measured temperature of the working fluid is, for example, measured at the exit of the secondary heat exchanger 102, in other words, measured after the secondary heat exchanger in the direction of circulation of the working fluid. If the measured temperature of the working fluid increases, the control unit sends a command for increasing the flow of dihydrogen 1001 to the flow controller 121. The increase in the flow of dihydrogen 1001 passing through the bypass pipe 12 then leads to a rise in the cooling of the first heat transfer fluid, in other words, the amount of heat transferred by the first heat transfer fluid to the dihydrogen 1001 in the first heat exchanger 101 per unit volume of the first heat transfer fluid increases. Consequently, the cooling of the working fluid is enhanced, in other words, the amount of heat transferred by the working fluid to the first heat transfer fluid in the secondary heat exchanger 102 increases.

Conversely, if the measured temperature of the working fluid decreases, for example when the measured temperature of the working fluid falls below a first predefined threshold, the control unit sends a command for decreasing the flow of dihydrogen 1001 to the flow controller 121. The decrease in the flow of dihydrogen 1001 passing through the bypass pipe 12 then leads to a decrease in the amount of heat per unit volume of the first heat transfer fluid transferred by the first heat transfer fluid to the dihydrogen 1001 in the first heat exchanger 101. The cooling of the working fluid is consequently reduced, in other words, the amount of heat transferred by the working fluid to the first heat transfer fluid in the secondary heat exchanger 102 decreases. The regulation of the flow of dihydrogen thus makes it possible to optimize the cooling of the working fluid while avoiding the working fluid freezing.

The flow of dihydrogen 1001 passing through the bypass pipe 12 may furthermore, or alternatively, be regulated by the flow controller 121, under the control of the control unit, according to a measured temperature of the first heat transfer fluid. The measured temperature of the first heat transfer fluid is, for example, measured at the entry of the first heat exchanger 101, in other words, measured before the first heat exchanger 101 in the direction of circulation of the first heat transfer fluid. When the measured temperature of the first heat transfer fluid decreases, for example when the temperature falls below a second predefined threshold, the control unit sends a command for reducing the flow of dihydrogen 1001 to the flow controller 121. Because of the decrease in the flow of dihydrogen 1001 passing through the bypass pipe 12, the amount of heat transferred by the first heat transfer fluid to the dihydrogen 1001 decreases. The temperature of the first heat transfer fluid at the exit of the first heat exchanger thus remains above the solidification temperature of the first heat transfer fluid, and the first heat transfer fluid does not freeze.

Figure 2:
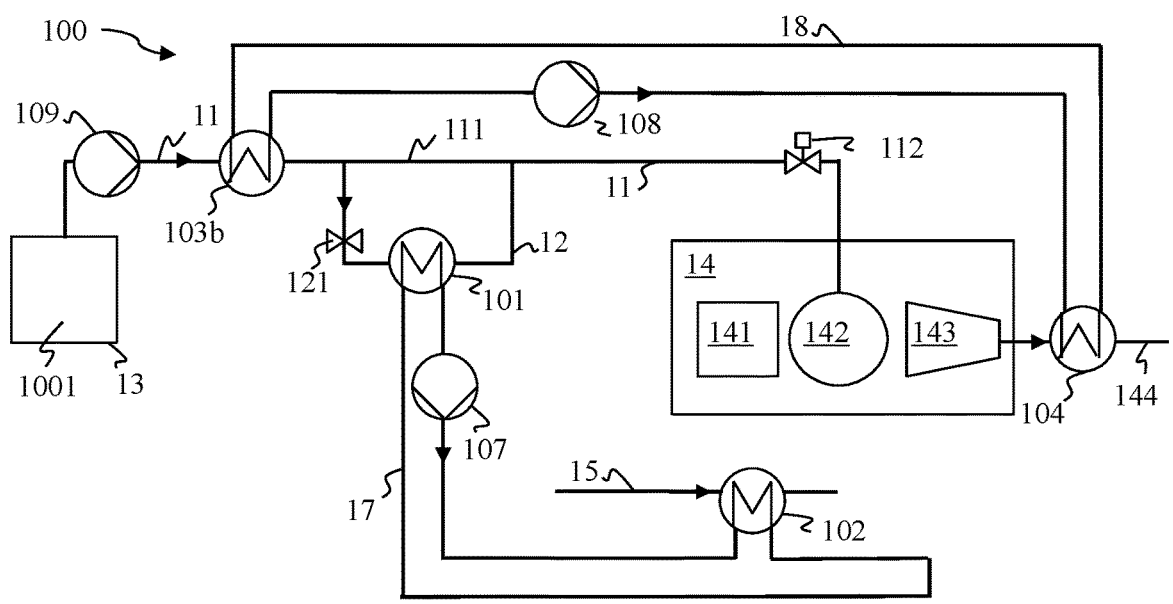
FIG. 2 schematically illustrates the system for combined heating and cooling according to a second exemplary embodiment.

FIG. 2 schematically illustrates the system 100 for combined heating and cooling according to a second exemplary embodiment.

The system 100 comprises the tank 13 storing the dihydrogen 1001, the main pipe 11 transporting the dihydrogen between the tank 13 and the combustion chamber 142 of the engine 14, and the bypass pipe 12. The system comprises the first closed circuit 17, which comprises the first heat exchanger 101 and the at least one secondary heat exchanger 102. The system 100 furthermore comprises the second closed circuit 18 comprising the third and fourth heat exchangers 103b and 104.

According to the second exemplary embodiment, the third heat exchanger 103b is located upstream of the predefined segment 111 of the main pipe 11, in other words, located on the same side of the predefined segment 111 as the tank 13. The dihydrogen 1001 is then in a gas state in the predefined segment 111 and in the bypass pipe 12.

The risk of the first heat transfer fluid freezing in the first heat exchanger 101 is therefore reduced in comparison with the first exemplary embodiment, since the temperature of the dihydrogen 1001 passing through the first heat exchanger 101 is higher.

Optionally, a fifth heat exchanger (not represented) may be added at an intersection between the second closed circuit 18 and the main pipe 11. The fifth heat exchanger is located on the second closed circuit 18 and, in the direction of circulation of the second heat transfer fluid, between the fourth heat exchanger 104 and the third heat exchanger 103b. The fifth heat exchanger is located on the main pipe 11, downstream of the bypass pipe 12, in other words, on the opposite side of the bypass pipe 12 from the tank 13.

The liquid dihydrogen 1001 is thus initially heated partially in the third heat exchanger 103b, then is partially transported through the bypass pipe 12, where the first heat exchange is carried out with the first heat transfer fluid, with a sufficiently high temperature to avoid the first heat transfer fluid freezing. The heating of the dihydrogen 1001 is then completed in the fifth heat exchanger, where the second heat transfer fluid is hotter than in the third heat exchanger 103b, in order to be used as fuel.

Figure 3:
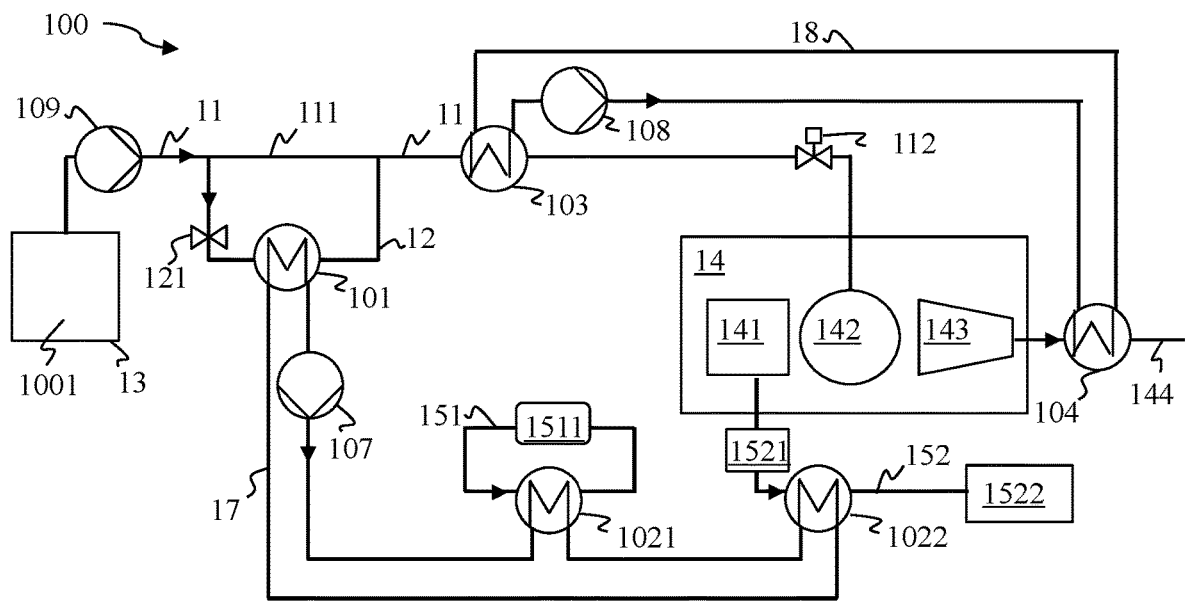
FIG. 3 schematically illustrates the system for combined heating and cooling according to a third exemplary embodiment.

FIG. 3 schematically illustrates the system 100 for combined heating and cooling according to a third exemplary embodiment.

The system 100 comprises the tank 13 storing the dihydrogen 1001, the main pipe 11 transporting the dihydrogen between the tank 13 and the combustion chamber 142 of the engine 14, and the bypass pipe 12. The system 100 furthermore comprises the second closed circuit 18 comprising the third and fourth heat exchangers 103 and 104.

In the third exemplary embodiment, the system comprises the first closed circuit 17 which, successively in the direction of circulation of the first heat transfer fluid, comprises the first heat exchanger 101, a first secondary heat exchanger 1021 and a second secondary heat exchanger 1022.

In a similar way to the heat exchangers 101, 102, 103, 104, each heat exchanger 1021, 1022 makes it possible to carry out a heat exchange between two fluids without mixing them, in other words, to transfer heat from one fluid to the other fluid across an exchange surface.

The first heat exchanger 101 makes it possible to carry out the first heat exchange between the first heat transfer fluid and the dihydrogen 1001 passing through the bypass pipe 12.

The first secondary heat exchanger 1021 makes it possible to carry out a first secondary heat exchange between the first heat transfer fluid and oil circulating in a closed oil circuit 151. The first secondary heat exchange leads to a transfer of heat from the oil to the first heat transfer fluid and thus makes it possible to cool the oil. The oil is transported in the oil circuit 151 between a working zone 1511, where the oil is reheated, and the first secondary heat exchanger 1021, where the oil is cooled.

The second secondary heat exchanger 1022 makes it possible to carry out a second secondary heat exchange between the first heat transfer fluid and compressed air that comes from the compressor 141 of the engine 14 and is transported through a compressed air pipe 152. The second secondary heat exchange leads to a transfer of heat from the compressed air to the first heat transfer fluid, and thus makes it possible to cool the compressed air.

The compressed air is used in an air-conditioning system of the aircraft. The compressed air is compressed and heated in the compressor 141 of the engine 14. The flow of the compressed air is regulated at the exit of the compressor 141 by a system of valves 1521 then sent through the second secondary heat exchanger 1022. At the exit of the second secondary heat exchanger 1022, the compressed air is transported to an air-conditioning system 1522, where it is used to pressurize and air-condition the cabin of the aircraft.

In the third exemplary embodiment, the operating temperature range of the first heat transfer fluid is sufficiently narrow to be able to cool the oil in the first secondary heat exchanger 1021 and to cool the compressed air in the second secondary heat exchanger 1022, and to avoid the oil freezing on the other hand, in other words, the oil falling below its solidification temperature.

The flow of dihydrogen 1001 is regulated by the flow controller 121, under the control of the control unit, according to the temperature of the oil measured at the exit of the first secondary heat exchanger 1021 and/or the temperature of the compressed air measured at the exit of the second secondary heat exchanger 1022.

For example, when the measured temperature of the oil increases, the control unit sends a command for increasing the flow of dihydrogen 1001 to the flow controller 121.

When the measured temperature of the oil decreases, for example when the temperature of the oil decreases and passes below a third predefined threshold, the control unit sends a command for reducing the flow of dihydrogen 1001 to the flow controller 121.

When the measured temperature of the compressed air increases, the control unit determines whether the measured temperature of the oil is above the third predefined threshold. If this is the case, the control unit sends an instruction for increasing the flow of dihydrogen 1001 to the flow controller 121.

Figure 4:
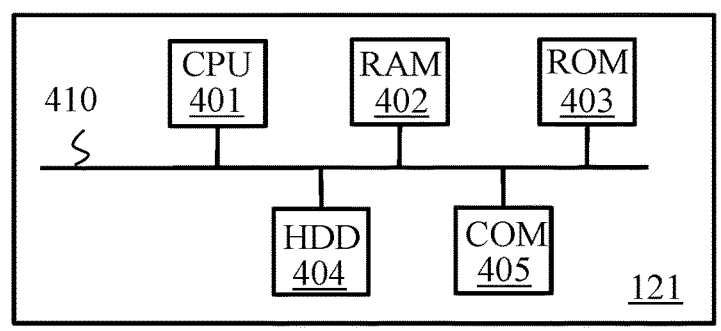
FIG. 4 schematically illustrates an example of the hardware architecture of an internal control unit of a flow controller of the system for combined heating and cooling.

FIG. 4 schematically illustrates an example of the hardware architecture of an internal control unit of the flow controller 121. The control unit internal to the flow controller 121 then comprises, connected by a communication bus 410: a processor or central processing unit (CPU) 401; a random-access memory (RAM) 402; a read-only memory (ROM) 403; a storage unit or a storage medium reader such as a hard disk drive (HDD) 404; and a communication interface 405 for communicating with elements such as temperature sensors.

The processor 401 is capable of executing instructions loaded into the RAM 402 from the ROM 403, an external memory (not represented), a storage medium or a communication network. When the control unit is powered up, the processor 401 is capable of reading instructions from the RAM 402 and executing them. These instructions form a computer program causing the processor 401 to implement all or some of the actions described above in connection with the control unit.

Thus, all or some of the actions described in connection with the control unit of the flow controller 121 may be implemented in software form via the execution of a set of instructions by a programmable machine, such as a DSP (digital signal processor) or a microcontroller, or in hardware form by a machine or a dedicated component, such as an FPGA (field-programmable gate array) or an ASIC (application-specific integrated circuit). According to one variant, the control unit described above is external to the flow controller 121 and comprises means for remote control of the flow controller 121.

FIG. 5 illustrates the aircraft 1 equipped with the system for combined heating and cooling.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for combined cooling and heating in an aircraft, the aircraft comprising an engine configured to use dihydrogen as fuel, the dihydrogen being stored in liquid form in a tank and being used in gas form in the engine, the engine being a turboprop, the dihydrogen being conveyed from the tank to the engine by means of a main pipe, wherein the method comprises:
branching off a part of the flow of dihydrogen in a bypass pipe, such that the bypass pipe is in parallel with a predefined segment of the main pipe between an inlet of the bypass pipe and an outlet of the bypass pipe, circulating a first heat transfer fluid in a first closed circuit, carrying out a first heat exchange between the first heat transfer fluid and the dihydrogen circulating in the bypass pipe,
returning the part of the flow of dihydrogen in the bypass pipe via the outlet of the bypass pipe to the main pipe upstream of the engine, and
carrying out at least one secondary heat exchange, each secondary heat exchange being carried out between the first heat transfer fluid and a working fluid that is used in the aircraft and needs to be cooled, wherein the working fluid is oil for lubricating the engine,
wherein the first closed circuit comprises, successively in a direction of circulation of the first heat transfer fluid, a first secondary heat exchanger, allowing heat exchange with the oil for lubricating the engine, and then a second secondary heat exchanger allowing heat exchange with compressed air that comes from an air conditioning system of the aircraft, the first secondary heat exchanger and the second secondary heat exchanger being connected in series in this order.

2. The method according to claim 1, furthermore comprising:
circulating a second heat transfer fluid in a second closed circuit,
carrying out a third heat exchange between the second heat transfer fluid and the dihydrogen circulating in a part of the main pipe, and
carrying out a fourth heat exchange between the second heat transfer fluid and an exhaust gas coming from a turbine of the engine.

3. The method according to claim 2, wherein the third heat exchange is carried out downstream of the predefined segment of the main pipe.

4. The method according to claim 2, wherein the third heat exchange is carried out upstream of the predefined segment of the main pipe.

5. The method according to claim 2, wherein the first heat transfer fluid has an operating temperature range narrower than an operating temperature range of the second heat transfer fluid.

6. The method according to claim 1, wherein the working fluid is compressed air coming from the engine and configured to be used in an air conditioning system of the aircraft.

7. The method according to claim 1, comprising a first secondary heat exchange between the first heat transfer fluid and a first working fluid and a second secondary heat exchange between the first heat transfer fluid and a second working fluid, the first working fluid being oil and the second working fluid being compressed air coming from the engine and configured to be used in an air conditioning system of the aircraft.

8. The method according to claim 1, furthermore comprising carrying out a regulation of the flow of dihydrogen circulating in the bypass pipe according to a temperature of the working fluid, which is measured at an exit of the secondary heat exchange through which said working fluid passes.

9. The method according to claim 1, furthermore comprising carrying out a regulation of the flow of dihydrogen circulating in the bypass pipe according to a temperature of the first heat transfer fluid, which is measured at an entry of the first heat exchange.

10. A system for combined cooling and heating in an aircraft, the aircraft comprising an engine configured to use dihydrogen as fuel, the dihydrogen being stored in liquid form in a tank and being used in gas form in the engine, the engine being a turboprop, the dihydrogen being conveyed from the tank to the engine by means of a main pipe, wherein the system comprises:

a bypass pipe mounted bypassing a predefined segment of the main pipe, the bypass pipe having an inlet upstream of the predefined segment and an outlet return to the main pipe downstream of the predefined segment, a first closed circuit configured to contain a first heat transfer fluid, a first circulator configured to circulate the first heat transfer fluid in the first closed circuit, a first heat exchanger installed so as to allow a first heat exchange between the first heat transfer fluid and the dihydrogen circulating in the bypass pipe, and a second heat exchanger installed to allow at least one secondary heat exchange, each secondary heat exchange being carried out between the first heat transfer fluid and a working fluid that is used in the aircraft and needs to be cooled, wherein the working fluid is oil for lubricating the engine, wherein the first closed circuit comprises, successively in a direction of circulation of the first heat transfer fluid, a first secondary heat exchanger, allowing heat exchange with the oil for lubricating the engine, and then a second secondary heat exchanger allowing heat exchange with compressed air that comes from an air conditioning system of the aircraft, the first secondary heat exchanger and the second secondary heat exchanger being connected in series in this order.

11. The system according to claim 10, wherein the first circulator corresponds to a pump.

12. The system according to claim 10, furthermore comprising:

a second closed circuit configured to contain a second heat transfer fluid, a second circulator configured to circulate the second heat transfer fluid in the second closed circuit, a third heat exchanger installed so as to allow a third heat exchange between the second heat transfer fluid and the dihydrogen circulating in a part of the main pipe, a fourth heat exchanger installed so as to allow a fourth heat exchange between the second heat transfer fluid and an exhaust gas coming from a turbine of the engine.

13. The system according to claim 12, wherein the second circulator corresponds to a pump.

14. An aircraft comprising at least one system according to claim 10.

* * * * *